United States Patent
Tateiwa (10) Patent No.: US 9,544,063 B2
(45) Date of Patent: Jan. 10, 2017

(54) METHOD FOR ADJUSTING OPTICAL RECEIVER AND APPARATUS FOR ADJUSTING POLARIZATION OF OPTICAL RECEIVER

(71) Applicant: Sumitomo Electric Industries, Ltd., Osaka-shi (JP)

(72) Inventor: Yoshihiro Tateiwa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 180 days.

(21) Appl. No.: 14/606,687

(22) Filed: Jan. 27, 2015

(65) Prior Publication Data
US 2015/0215049 A1  Jul. 30, 2015

(30) Foreign Application Priority Data
Jan. 28, 2014 (JP) ................................ 2014-013595

(51) Int. Cl.
| | | |
|---|---|---|
| H04B 10/07 | (2013.01) | |
| H04B 10/61 | (2013.01) | |
| G02B 6/42 | (2006.01) | |
| G02B 6/27 | (2006.01) | |

(52) U.S. Cl.
CPC ......... *H04B 10/6162* (2013.01); *G02B 6/4213* (2013.01); *G02B 6/2766* (2013.01)

(58) Field of Classification Search
CPC .. H04B 10/6162; G02B 6/4213; G02B 6/2766
USPC .......................................................... 398/208
See application file for complete search history.

(56) References Cited

U.S. PATENT DOCUMENTS

2003/0165284 A1* 9/2003 Takabayashi ...... H04B 10/2569
385/11
2010/0054753 A1* 3/2010 Futami ................. G02B 6/272
398/152

FOREIGN PATENT DOCUMENTS

JP       05-158096       6/1993

* cited by examiner

*Primary Examiner* — Juan A Torres
(74) *Attorney, Agent, or Firm* — Venable LLP; Michael A. Sartori (57) ABSTRACT

An optical receiver is disclosed. The optical receiver includes a polarization holding fiber configured to receive a light emitted from a light source and a polarizer configured to be irradiated with the light output from the polarization holding fiber. A method for adjusting the optical receiver comprises: inputting a plurality of lights having different wavelengths to a polarization holding fiber; detecting intensities of a plurality of lights output from the polarization holding fiber; calculating an adjustment value for an angle of the polarization holding fiber based on a ratio between the detected intensities of the plurality of lights; and adjusting the angle of the polarization holding fiber based on the calculated adjustment value.

10 Claims, 8 Drawing Sheets

METHOD FOR ADJUSTING OPTICAL RECEIVER AND APPARATUS FOR ADJUSTING POLARIZATION OF OPTICAL RECEIVER

FIELD

The present invention relates to a method for adjusting an optical receiver and an apparatus for adjusting polarization of an optical receiver.

BACKGROUND

To an optical receiver such as an optical receiving device for coherent communication, an optical signal with multiplexed polarization or phases is input via a polarization holding fiber, and the optical signal is split depending on polarization by a polarization beam splitter (PBS). The split optical signal is separated depending on phases, for example, by a 90-degree optical hybrid device. The separated optical signals are converted into electric signals by light receiving elements. For example, Japanese Patent Laid-Open No. 5-158096 discloses a technique in which an optical coupler as the 90-degree optical hybrid device is used in an optical receiving device for coherent communication.

SUMMARY

For example, in a process of separating phases of an optical signal using the 90-degree optical hybrid device or the like, a continuous wave (CW) light is used as a reference light. The reference light is a standard for a signal light. Thus, polarization of the reference light needs to be input to a polarization holding fiber of an optical receiver while being controlled in a constant direction.

In order to control the polarization of the reference light in the constant direction, an axial angle of the polarization holding fiber is adjusted. As a method for adjusting the axial angle of the polarization holding fiber, for example, a method of connecting a master polarization holding fiber to the polarization holding fiber of the optical receiver using a connector and measuring crosstalk of the polarization holding fiber is conceivable. In this method, the axial angle of the polarization holding fiber is adjusted so as to minimize the crosstalk.

In the adjusting method described above, the master polarization holding fiber is essential in measurement principle, and it is important to adjust the master polarization holding fiber with high accuracy. However, in the case where the polarization holding fiber is mounted via a component such as a PBS, there is a problem that high adjustment accuracy of the master polarization holding fiber cannot be held. In the adjusting method described above, there is a problem that an amount of change is small near a minimum point of the crosstalk of the polarization holding fiber, so that the adjustment of the axial angle of the polarization holding fiber is not sufficiently optimized.

An object of an aspect of the present invention is to provide a method for adjusting an optical receiver and an apparatus for adjusting polarization of an optical receiver capable of adjusting an angle of a polarization holding fiber without using crosstalk of the polarization holding fiber.

An optical receiver according to an aspect of the present invention includes a polarization holding fiber configured to receive a light emitted from a light source and a polarizer configured to be irradiated with the light output from the polarization holding fiber, and a method for adjusting an optical receiver comprises: inputting a plurality of lights having different wavelengths to a polarization holding fiber; detecting intensities of the plurality of lights output from the polarization holding fiber; calculating an adjustment value for an angle of the polarization holding fiber based on a ratio between the detected intensities of the plurality of lights; and adjusting the angle of the polarization holding fiber based on the calculated adjustment value.

An apparatus for adjusting polarization of an optical receiver according to another aspect of the present invention comprises: a polarization holding fiber configured to receive a light emitted from a light source; a polarizer configured to be irradiated with the light output from the polarization holding fiber; a polarization controller configured to adjust an angle of the polarization holding fiber; and a control unit configured to control the polarization controller, wherein, after the control unit detects intensities of a plurality of lights having different wavelengths and being output from the polarization holding fiber, the control unit is configured to calculate an adjustment value for an angle of the polarization holding fiber based on a ratio between the detected intensities of the plurality of lights, and wherein the polarization controller is configured to adjust the angle of the polarization holding fiber based on the calculated adjustment value.

DETAILED DESCRIPTION

Description of Embodiments

First of all, embodiments of the invention of the subject application will be described as enumerated below.

A method for adjusting an optical receiver according to an embodiment of the present invention is a method for adjusting an optical receiver including a polarization holding fiber configured to receive a light emitted from a light source and a polarizer configured to be irradiated with the light output from the polarization holding fiber, comprising: inputting a plurality of lights having different wavelengths to a polarization holding fiber; detecting intensities of the plurality of lights output from the polarization holding fiber; calculating an adjustment value for an angle of the polarization holding fiber based on a ratio between the detected intensities of the plurality of lights; and adjusting the angle of the polarization holding fiber based on the calculated adjustment value.

According to the method for adjusting an optical receiver, the intensities of the plurality of lights output from the polarization holding fiber are detected. In the case where the angle of the polarization holding fiber in the optical receiver is not appropriately adjusted, the intensity of the light emitted from the polarization holding fiber and having passed through the polarizer changes depending on wavelength. Using this characteristic, it is possible to calculate the adjustment value for the angle of the polarization holding fiber based on the ratio between the detected intensities of the plurality of lights. It is also possible to adjust the angle of the polarization holding fiber based on the calculated adjustment value. Thus, it is possible to adjust the angle of the polarization holding fiber without using crosstalk of the polarization holding fiber.

Also, each of the plurality of lights output from the polarization holding fiber may be adjusted in polarization so that light receiving sensitivity of the optical receiver is maximum. By adjusting the polarization thereof in this manner, the adjustment value for adjusting the angle of the polarization holding fiber is calculated with high accuracy.

In a case where: the adjustment value is an angle $\theta$; a highest intensity among the detected intensities of the plurality of lights is Pmax; and a lowest intensity among the detected intensities of the plurality of lights is Pmin, the angle $\theta$ may be calculated from formula (1). By calculating the angle $\theta$ for adjusting the angle of the polarization holding fiber in this manner, the adjustment value is calculated with higher accuracy.

$$\cos 2\theta = \sqrt{P\text{min}/P\text{max}} \quad (1)$$

Also, the adjustment value may be an amount of offset between a polarization angle of the polarization holding fiber and a polarization angle of the polarizer, and the adjusting of the angle of the polarization holding fiber may include reducing the amount of offset. If the polarization angle of the polarization holding fiber is offset with respect to the polarization angle of the polarizer, the detected intensities of the lights differ depending on wavelengths of the lights. Thus, by calculating the amount of offset between the polarization angle of the polarization holding fiber and the polarization angle of the polarizer based on the ratio between the detected intensities of the lights, it is possible to adjust the angle of the polarization holding fiber without using crosstalk of the polarization holding fiber.

The method for adjusting an optical receiver described above may further comprise securing the polarization holding fiber with the angle being adjusted.

The method for adjusting an optical receiver described above may further comprise connecting the polarization holding fiber to the optical receiver.

An apparatus for adjusting polarization of an optical receiver according to another embodiment of the present invention comprises: a polarization holding fiber configured to receive a light emitted from a light source; a polarizer configured to be irradiated with the light output from the polarization holding fiber; a polarization controller configured to adjust an angle of the polarization holding fiber; and a control unit configured to control the polarization controller, wherein, after the control unit detects intensities of a plurality of lights having different wavelengths and being output from the polarization holding fiber, the control unit is configured to calculate an adjustment value for the angle of the polarization holding fiber based on a ratio between the detected intensities of the plurality of lights, and wherein the polarization controller is configured to adjust the angle of the polarization holding fiber based on the calculated adjustment value.

Also, each of the plurality of lights output from the polarization holding fiber may be adjusted by the polarization controller so that light receiving sensitivity of the optical receiver is maximum.

In a case where: the adjustment value is an angle $\theta$; a highest intensity among the detected intensities of the plurality of lights is Pmax; and a lowest intensity among the detected intensities of the plurality of lights is Pmin, the angle $\theta$ is calculated from formula (1). The polarization controller may adjust the angle of the polarization holding fiber based on the angle $\theta$.

$$\cos 2\theta = \sqrt{P\text{min}/P\text{max}} \quad (1)$$

Also, the adjustment value may be an amount of offset between the polarization angle of the polarization holding fiber and the polarization angle of the polarizer, and the polarization controller may be configured to make adjustment to reduce the amount of offset of the angle of the polarization holding fiber.

Details of Embodiments

Specific examples of a method for adjusting an optical receiver and an apparatus for adjusting polarization of an optical receiver of the present invention will be described below with reference to the accompanying drawings. It should be noted that the present invention is not limited to these examples but shown in the claims, and it is intended that all modifications that come within the meaning and range of equivalence to the claims should be embraced herein. In the description, the same elements or elements having the same function are denoted with the same reference signs, and an overlapping description will be omitted.

Figure 1:
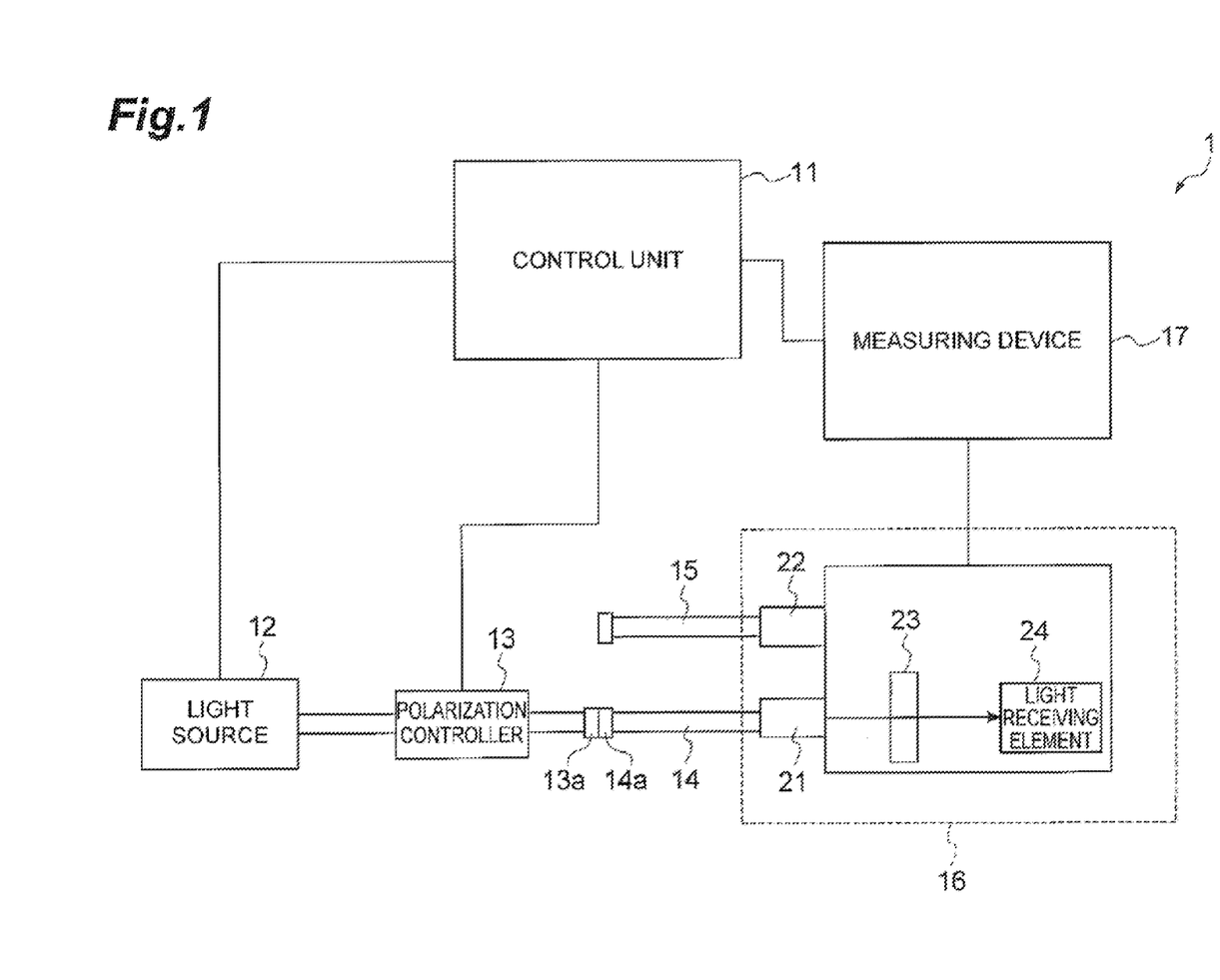
FIG. 1 is a block diagram showing a measuring system for performing a method for adjusting an optical receiver (an apparatus for adjusting polarization of an optical receiver) according to an embodiment of the present invention.

FIG. 1 is a block diagram showing a measuring system for performing a method for adjusting an optical receiver according to this embodiment. As shown in FIG. 1, the measuring system (an apparatus for adjusting polarization of an optical receiver) 1 includes, for example, a control unit 11, a light source 12, a polarization controller 13, polarization holding fibers 14, 15, an optical receiver 16, and a measuring device 17. The control unit 11 controls, for example, the light source 12, the polarization controller 13, and the measuring device 17. The measuring system 1 does not necessarily include the optical receiver 16.

The light source 12 emits a plurality of lights having different wavelengths via the polarization controller 13 to the optical receiver 16. The lights emitted from the light source 12 may be lights with a plurality of wavelengths switched or a plurality of wavelengths superimposed. The light source 12 may emit a reference light for the optical receiver 16.

The polarization controller 13 controls polarization of the lights emitted from the light source 12. The polarization controller 13 may adjust any of the plurality of lights to linear polarization so that light sensitivity detected by the optical receiver 16 is maximum. The polarization controller 13 includes a connector 13a.

The polarization holding fibers 14, 15 are configured so that a refractive index differs (that is, a speed of light differs) depending on polarization directions of input lights, and examples thereof include a PANDA fiber and a bow-tie fiber. The polarization holding fiber 14 is connected via a connector 14a to the connector 13a of the polarization controller 13. The plurality of lights having different wavelengths and being emitted from the light source 12 are input to the polarization holding fiber 14. Hereinafter, the angle of the polarization of the light held by the polarization holding fiber 14 is referred to as a polarization angle of the polarization holding fiber 14.

The optical receiver 16 receives a signal in a signal light, for example, by causing the reference light to interfere with the signal light. As shown in FIG. 1, the optical receiver 16 includes, for example, fiber holders 21, 22, a polarizer 23, and a light receiving element 24. The fiber holder 21 rotatably holds the polarization holding fiber 14, and the fiber holder 22 rotatably holds the polarization holding fiber 15.

The polarizer 23 is a member that transmits only lights in a particular polarization direction, and examples thereof include a polarization plate. Hereinafter, a polarization direction through the polarizer 23 is referred to as a polarization angle of the polarizer 23. The light output from the polarization holding fiber 14 is irradiated with the polarizer 23. The light receiving element 24 is a member that detects the intensity of the irradiated light, and an example thereof includes a photodiode. The light receiving element 24 detects the light having passed through the polarizer 23.

The measuring device 17 measures various parameters, and calculates an adjustment value for the angle of the polarization holding fiber 14. The adjustment value for the angle of the polarization holding fiber 14 is, for example, an amount of offset between the polarization angle of the polarization holding fiber 14 and the polarization angle of the polarizer 23. The adjustment value for the angle of the polarization holding fiber 14 is calculated based on the intensities of the plurality of lights detected by the light receiving element 24, details of the calculation method will be described later. The measuring device 17 may input, for example, calculated results to the control unit 11, and the control unit 11 may control the light source 12 and the polarization controller 13 based on the calculation results.

Figure 2:
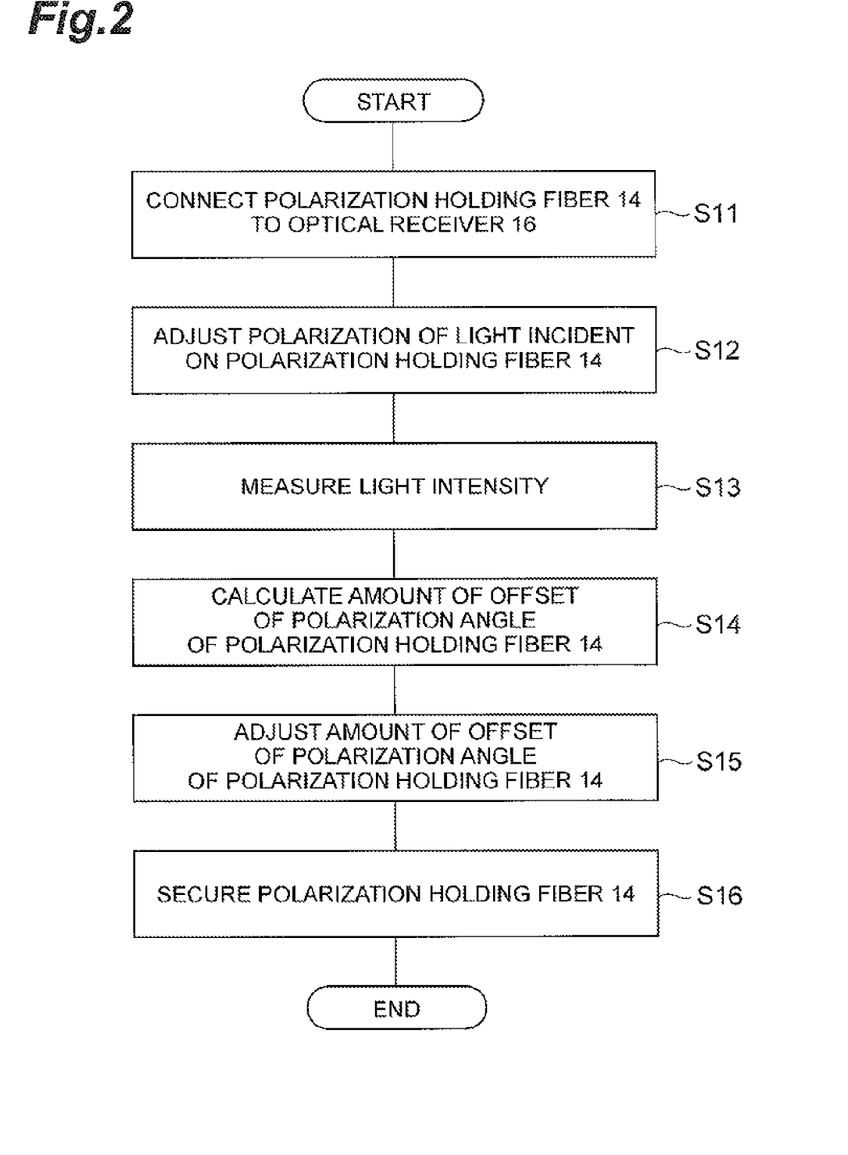
FIG. 2 is a flowchart showing the method for adjusting an optical receiver according to the embodiment of the present invention.

Next, with reference to FIGS. 1 and 2, the method for adjusting an optical receiver according to this embodiment will be described. FIG. 2 is a flowchart showing the method for adjusting the optical receiver 16 according to this embodiment.

First, as shown in FIG. 2, as a first step, the polarization holding fiber 14 is connected to the optical receiver 16 (step S11). The polarization holding fiber 14 is rotatably connected to the fiber holder 21 provided in the optical receiver 16.

Then, as a second step, polarization of the light input from the light source 12 to the polarization holding fiber 14 is adjusted (step S12). The adjustment of the polarization is performed by the polarization controller 13, and the polarization is adjusted so that light receiving sensitivity of the light receiving element 24 is maximum. Thus, the light input to the polarization holding fiber 14 is of linear polarization, and light receiving sensitivity of the optical receiver 16 is increased. An angle of the linear polarization is equal to or substantially equal to the polarization angle of the polarizer 23. The plurality of lights are emitted from the light source 12, and wavelengths of the plurality of lights are different.

Then, as a third step, the intensity of the input light is detected (step S13). In step S13, the intensities of the plurality of lights having different wavelengths and being input to the polarization holding fiber 14 are detected by the light receiving element 24. The detected intensity of the light is represented, for example, by light receiving sensitivity (A/W). In the third step, a maximum value and a minimum value of the intensity (light receiving sensitivity) detected by the light receiving element 24 are obtained.

Next, as a fourth step, the adjustment value for the angle of the polarization holding fiber 14 is calculated (step S14). The adjustment value for the angle of the polarization holding fiber 14 is calculated based on the intensities of the plurality of lights detected by the light receiving element 24. In this embodiment, the adjustment value for the angle of the polarization holding fiber 14 is an amount of offset between the polarization angle of the polarization holding fiber 14 and the polarization angle of the polarizer 23.

Then, as a fifth step, the angle of the polarization holding fiber 14 is adjusted based on the calculated adjustment value (step S15). In this embodiment, the angle is adjusted so that the amount of offset between the polarization angle of the polarization holding fiber 14 and the polarization angle of the polarizer 23 is small. The angle may be adjusted so that the amount of offset between the polarization angle of the polarization holding fiber 14 and the polarization angle of the polarizer 23 is zero. An example of a method for adjusting the angle of the polarization holding fiber 14 includes a method of automatically or manually rotating the polarization holding fiber 14.

Finally, as a sixth step, the polarization holding fiber 14 is secured (step S16). The polarization holding fiber 14 is welded, for example, by a YAG laser and thus secured to the fiber holder 21. From the above, the position and the angle of the polarization holding fiber 14 in the optical receiver 16 are adjusted.

Figure 3A:
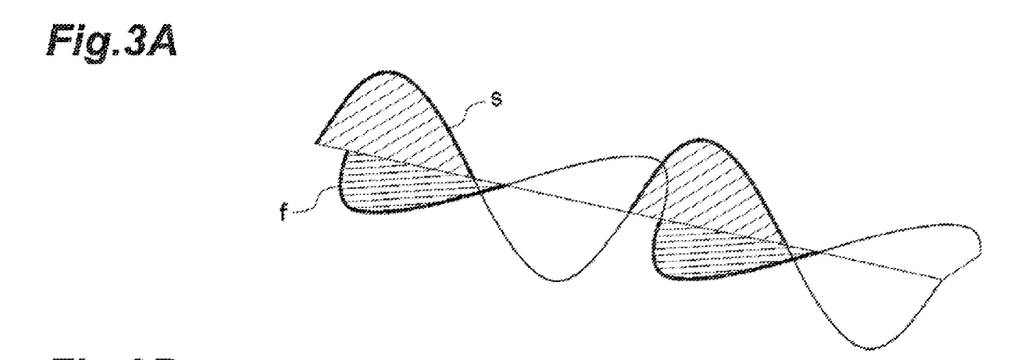
FIG. 3A shows an image of a light propagating in a polarization holding fiber.
Figure 3B:
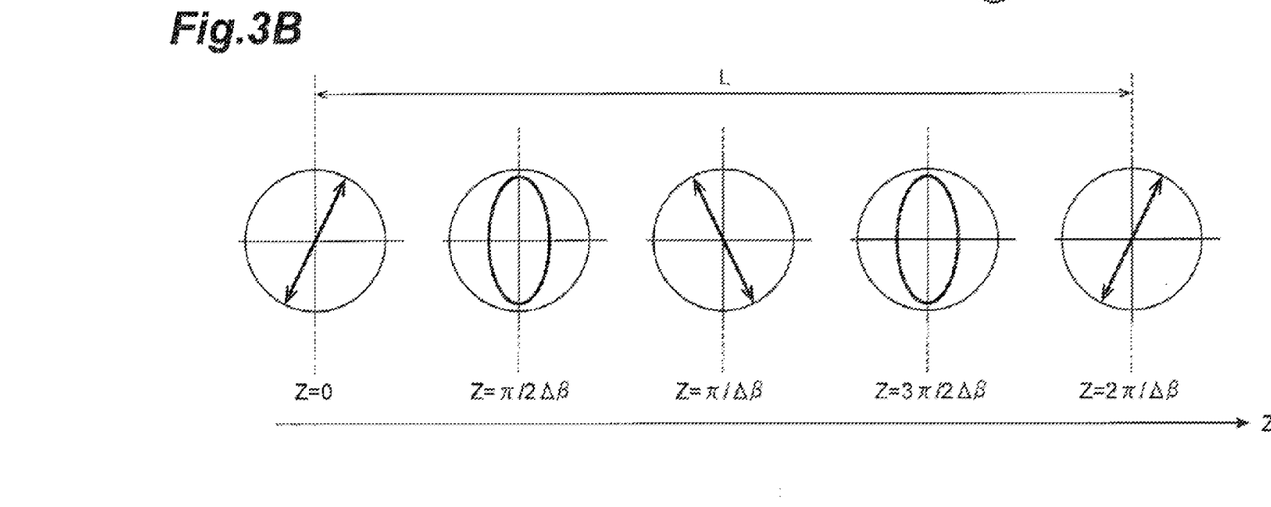
FIG. 3B shows changes in polarization of the light propagating in the polarization holding fiber.

Next, an example of a method for calculating an adjustment value of an angle when the polarization holding fiber is mounted to the optical receiver or the like, using the above-described measuring system, will be described. First, with reference to FIGS. 3A and 3B, it will be described that the polarization direction of the light output from the polarization holding fiber has wavelength dependency. FIG. 3A shows an image of the light propagating in the polarization holding fiber, and FIG. 3B shows changes in polarization of the light propagating in the polarization holding fiber.

In the polarization holding fiber 14, a refractive index differs depending on the polarization directions, and thus the speed of light differs depending on the polarization directions. Thus, in the case where a light inclined with respect to the polarization angle of the polarization holding fiber 14 is input, as shown in FIG. 3A, a couple of polarization components of the light with 90 degrees different vibration directions exhibit different behaviors from each other. Since the two split polarization components are different in speed, one of the components is a Slow-axis component s of the light in the polarization holding fiber 14, and the other is a Fast-axis component f of the light. A difference $\Delta\beta$ in propagation constant between the Slow-axis component s of the light and the Fast-axis component f of the light prevents coupling between the axis components, and the mutual axis components are held. In addition, a phase difference occurs at an emission end between the Slow-axis component s of the light and the Fast-axis component f of the light. Thus, the polarization angle of the light emitted from the polarization holding fiber 14 (that is, the polarization of a combined light of the Slow-axis component s and the Fast-axis component f) is different from the polarization angle of the polarization holding fiber 14 and the polarization direction of the light input from the light source 12.

The change in polarization occurs in the entire region in the polarization holding fiber 14. Specifically, as shown in FIG. 3B, in the polarization holding fiber 14, changes from the linear polarization via elliptic polarization and the like back to the original linear polarization occur along a longitudinal direction Z of the polarization holding fiber 14. A distance from the linear polarization back to the original linear polarization is a beat length L. $L=2\pi/\Delta\beta$. In the cases of $Z=L/4=\pi/2\Delta\beta$ and $Z=3L/4=3\pi/2\Delta\beta$, the polarization of the light is elliptic polarization. In the case of $Z=L/2=\pi/\Delta\beta$, the polarization of the light is linear polarization inclined symmetrically with respect to the polarization angle of the polarization holding fiber 14. Here, the beat length L changes depending on the wavelength of the light. Thus, in the case where the light input to the polarization holding fiber 14 of any length is input to be inclined by a predetermined angle with respect to the polarization angle of the polarization holding fiber 14, the light is emitted from the polarization holding fiber 14 in a polarization state depending on the wavelength of the light, with reference to linear polarization of the predetermined angle. Thus, the intensity of the light detected by the light receiving element 24 significantly varies depending on the wavelength of the light.

Next, an example of a method of calculating the adjustment value for the angle of the polarization holding fiber 14 using wavelength dependency in the polarization direction of the light will be described. In the case where the light inclined with respect to the polarization angle of the polarization holding fiber 14 is input to the polarization holding fiber 14, the polarization direction of the light emitted from the polarization holding fiber 14 changes depending on the wavelength of the light as described above. Thus, even if the light is adjusted in polarization by the polarization controller 13 so that the light receiving sensitivity of the optical receiver 16 is maximum, the intensity of the light detected by the optical receiver 16 varies depending on the wavelength of the light. Here, a highest intensity among the intensities of the plurality of lights detected by the light receiving element 24 in the optical receiver 16 is Pmax, and a lowest intensity among the detected intensities of the plurality of lights is Pmin. When the adjustment value for the angle of the polarization holding fiber 14 is an angle θ, a relationship between the angle θ, Pmax, and Pmin is shown by formula (1). Thus, the adjustment value for the angle of the polarization holding fiber 14 is calculated from formula (1).

$$\cos 2\theta = \sqrt{Pmin/Pmax} \tag{1}$$

Figure 4:
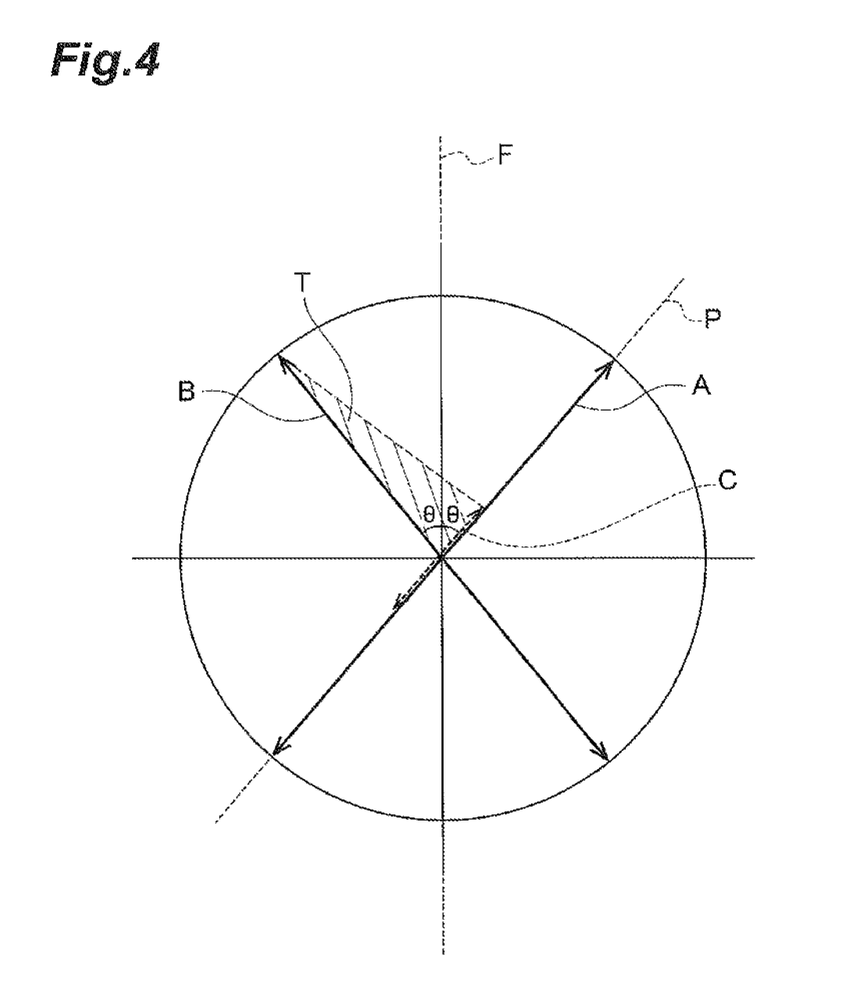
FIG. 4 shows variations in amplitude of the light in the case where a polarization angle of the polarization holding fiber is inclined with respect to a polarization angle of a polarizer.

Formula (1) will be described with reference to FIG. 4. FIG. 4 shows variations in amplitude of the light in the case where the polarization angle of the polarization holding fiber is inclined with respect to the polarization angle of the polarizer. In FIG. 4, the axis F corresponds to the polarization angle of the polarization holding fiber 14, and the axis P corresponds to the polarization angle or the polarizer 23. The axis F is inclined by the angle θ with respect to the axis P. That is, the angle θ is the adjustment value for the angle of the polarization holding fiber 14, and the polarization angle of the polarization holding fiber 14 is offset by the angle θ with respect to the polarization angle of the polarizer 23.

The polarization direction of the light adjusted by the polarization controller 13 so that the light receiving sensitivity of the light receiving element 24 is maximum is linear polarization, and an angle of the linear polarization is equal to the polarization angle of the polarizer 23. By varying the wavelength of the light from that state, due to the wavelength dependency of the polarization holding fiber 14, the polarization direction of the light output from the polarization holding fiber 14 changes between the direction of the linear polarization and a line-symmetric direction with respect to the direction with the axis F being an axis of symmetry. Specifically, if the polarization angle of the polarization holding fiber 14 is offset by the angle θ with respect to the polarization angle of the polarizer 23, the polarization direction of the light output from the polarization holding fiber 14 varies within a range of ±θ around the axis F with changes in the wavelength of the light. Thus, the intensity of the light after passing through the polarizer 23 varies with changes in the wavelength of the light. The amount of light is detected by the light receiving element 24.

Here, FIG. 4 shows a double-headed arrow A extending along an axis P from an intersection between the axis F and the axis P. A direction of the double-headed arrow A represents a polarization direction of the linear polarization, and a length of the double-headed arrow A represents the amplitude of the light. When the light in the state shown by the double-headed arrow A reaches the polarizer 23, the polarization direction thereof is equal to the polarization angle of the polarizer 23 (the axis P), and thus substantially all amount of light passes through the polarizer 23. Thus, when the polarization direction of the light output from the polarization holding fiber 14 is the direction of the double-headed arrow A as shown in FIG. 4, the light intensity detected by the light receiving element 24 is maximum. Furthermore, FIG. 4 further shows a double-headed arrow B extending in a line-symmetric direction with respect to the double-headed arrow A with the axis F being an axis of symmetry. The direction of the double-headed arrow B represents the polarization direction in the largest variation from the polarization direction thereof with changes in the wavelength of the light, and the length of the double-headed arrow B represents the amplitude of the light. When the light in the state represented by the double-headed arrow B reaches the polarizer 23, the polarization direction is offset by 2θ with respect to the polarization angle of the polarizer 23, and thus a direction component (a double-headed arrow C in FIG. 4) of the polarization angle of the polarizer 23 in the double-headed arrow B passes through the polarizer 23. Thus, when the polarization direction of the light output from the polarization holding fiber 14 is the direction of the double-headed arrow B, light intensity detected by the light receiving element 24 is minimum.

In FIG. 4, assuming a right triangle T with the double-headed arrow B as a hypotenuse and the double-headed arrow C as a base, an angle formed by the hypotenuse and the base is 2θ. The intensity of the light is proportional to a square of the amplitude of the light, and thus a square root of the intensity of the light is the amplitude of the light. Thus, in the case where the intensity of the light (light receiving sensitivity) when the amplitude of the light represented by the double-headed arrow A is detected by the light receiving element 24 is Pmax, and the intensity of the light (light receiving sensitivity) when the amplitude, of the light represented by the double-headed arrow C is detected by the light receiving element 24 is Pmin, cos 2θ is expressed by formula (1) as a square root of a ratio between Pmax and Pmin.

Figure 5:
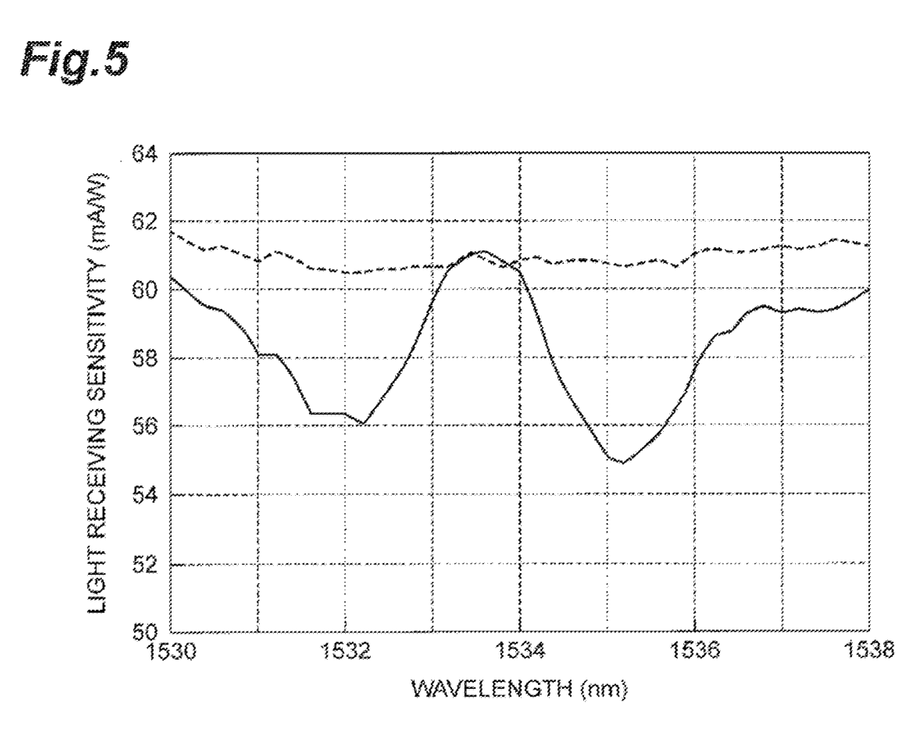
FIG. 5 shows changes in light receiving sensitivity before and after adjustment of the angle of the polarization holding fiber within a predetermined wavelength range.

Based on formula (1) and the intensities Pmax, Pmin of the lights detected by the light receiving element 24, the angle θ formed by the axis F and the axis P is calculated. FIG. 5 shows changes in light receiving sensitivity before and after adjustment of the angle of the polarization holding fiber within a predetermined wavelength range. In FIG. 5, a solid line represents a relationship between the wavelength of the light and light receiving sensitivity of the light receiving element 24 before adjustment of the polarization holding fiber 14. A broken line represents a relationship between the wavelength of the light and the light receiving sensitivity of the light receiving element 24 after adjustment of the polarization holding fiber 14. The range of the wavelength of the light detected by the light receiving element 24 is 1530 nm to 1538 nm.

As shown in FIG. 5, before adjustment of the polarization holding fiber 14, wavelength dependency was found in the detected light receiving sensitivity, a maximum value of the light receiving sensitivity was 61.3 mA/W, and a minimum value was 55.7 mA/W. Based on the values and formula (1) described above, the angle θ as the amount of offset between the polarization angle of the polarization holding fiber 14 and the polarization angle of the polarizer 23 was calculated to be about 9.7°. It was confirmed that by adjusting the polarization holding fiber 14 so that the angle θ is zero, flat sensitivity properties (sensitivity properties having small variation) can be obtained irrespective of the wavelength of the light as represented by the broken line in FIG. 5.

Alternatively, without using formula (1), the adjustment value for the angle of the polarization holding fiber 14 may be calculated using the wavelength dependency described above. In this case, the number of the wavelengths of the light detected by the optical receiver 16 may be small. When one wavelength of the light is detected by the optical receiver 16, it is impossible to determine whether the detected light receiving sensitivity is a maximum value or not. Thus, it is preferable that at least two wavelengths of the light are detected.

Figure 6:
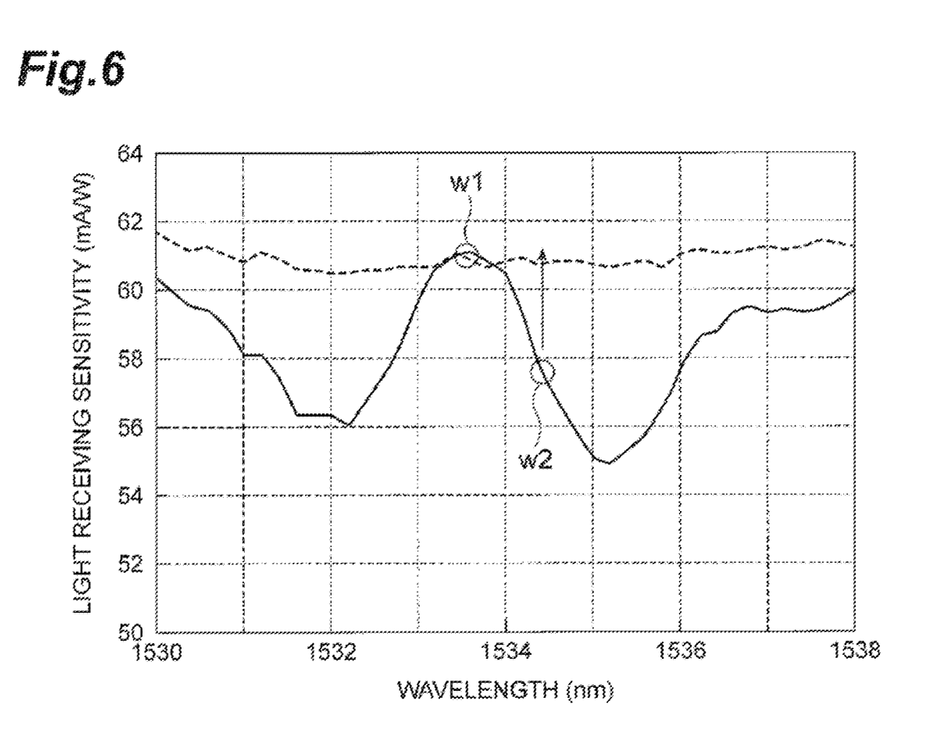
FIG. 6 shows changes in light receiving sensitivity before and after adjustment of the angle of the polarization holding fiber within the predetermined wavelength range.

As shown in FIG. 6, light receiving sensitivities at two different wavelengths W1, W2 may be confirmed within a predetermined wavelength range to adjust the angle of the polarization holding fiber 14 so that the light receiving sensitivities are maximum values. In this case, as represented by the broken line in FIG. 6, flat sensitivity properties can be obtained irrespective of the wavelength of the light. In addition, all the intensifies of the lights within the predetermined wavelength range are not detected, thereby allowing easy calculation of the adjustment value for the angle of the polarization holding fiber 14.

Figure 7:
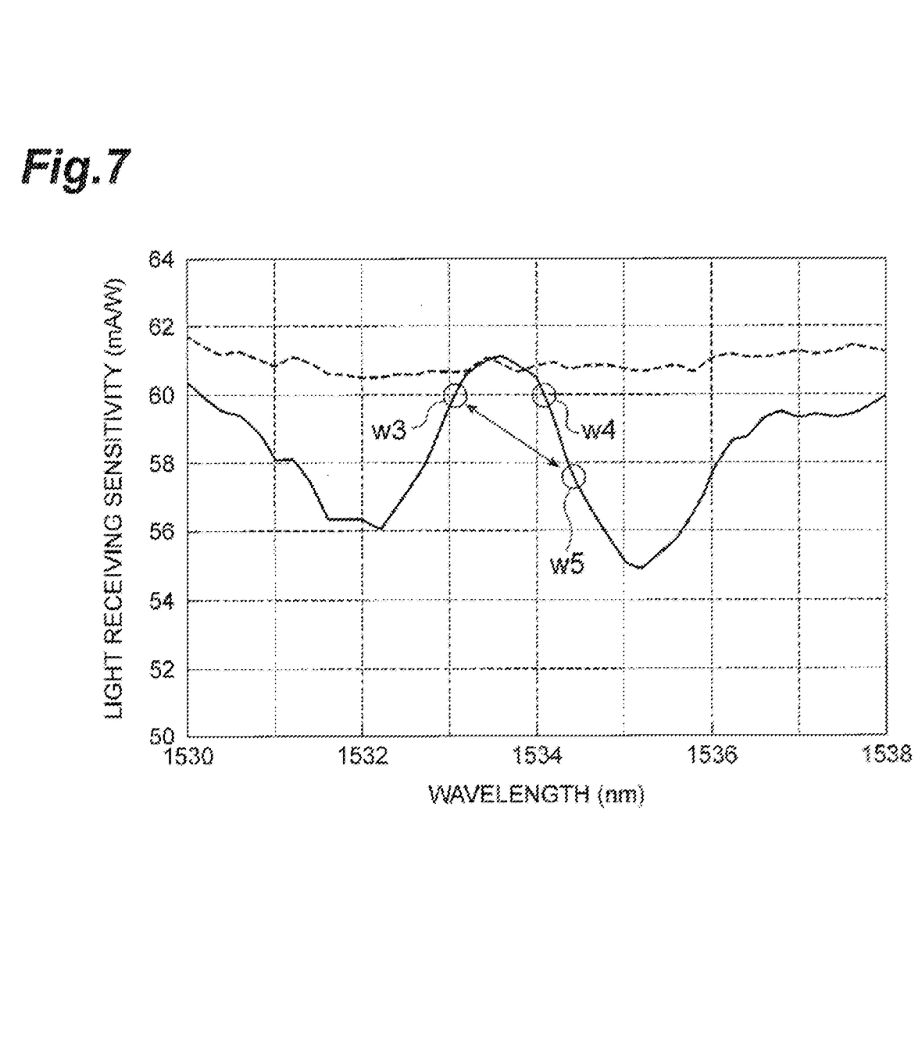
FIG. 7 shows changes in light receiving sensitivity before and after adjustment of the angle of the polarization holding fiber within the predetermined wavelength range.

Alternatively, as shown in FIG. 7, light receiving sensitivities at three different wavelengths W3, W4, W5 may be confirmed within the predetermined wavelength range. Using the confirmed wavelengths W3, W4, W5, the angle of the polarization holding fiber 14 may be adjusted so that the light receiving sensitivities are maximum values. Also in this case, as represented by the broken line in FIG. 7, flat sensitivity properties can be obtained irrespective of the wavelength of the light. Also, in the case of setting relatively wide spaces between the obtained wavelengths, and confirming light receiving sensitivities at the three different wavelengths W3, W4, W5 within the predetermined wavelength range, the angle of the polarization holding fiber 14 may be adjusted so that differences between the light receiving sensitivities are minimum.

Advantages obtained by the method for adjusting the optical receiver 16 using the measuring system (apparatus for adjusting polarization) according to this embodiment as described above will be described. As described above, according to the method for adjusting the optical receiver 16 according to this embodiment, the intensities of the plurality of lights output from the polarization holding fiber 14 are detected by the light receiving element 24 of the optical receiver 16. If the angle of the polarization holding fiber 14 in the optical receiver 16 is not appropriately adjusted, the intensity of the light having emitted from the polarization holding fiber 14 and passed through the polarizer 23 changes depending on wavelength. Using this characteristic, based on a ratio between the intensities of the plurality of lights detected by the light receiving element 24, it is possible to calculate the adjustment value for the angle of the polarization holding fiber 14. Then, based on the calculated adjustment value, it is possible to adjust the angle of the polarization holding fiber 14. Thus, it is possible to adjust the angle of the polarization holding fiber 14 without using crosstalk of the polarization holding fiber 14. Furthermore, according to the adjusting method, the intensities of the plurality of lights significantly vary depending on the wavelengths of the lights, thereby allowing estimation of the adjustment value with high accuracy. In addition, according to the adjusting method described above, the adjustment value for the angle of the polarization holding fiber 14 is calculated only using the light source 12 and the polarization controller 13, and thus it is possible to adjust the angle of the polarization holding fiber 14 with more simple equipment as compared to a conventional adjusting method.

Each of the plurality of lights output from the polarization holding fiber 14 may be adjusted in polarization so that the light receiving sensitivity of the light receiving element 24 is maximum. By adjusting the polarization thereof in this manner, the adjustment value for adjusting the angle of the polarization holding fiber 14 is calculated with high accuracy.

In a case where the adjustment value is the angle θ, the highest intensity among the detected intensities of the plurality of lights is Pmax, and the lowest intensity among the detected intensities of the plurality of lights is Pmin, the angle θ may be calculated from formula (1). By calculating the angle θ for adjusting the angle of the polarization holding fiber 14, the angle θ is calculated with higher accuracy.

The adjustment value may be the amount of offset between the polarization angle of the polarization holding fiber 14 and the polarization angle of the polarizer 23, and the step of adjusting the angle of the polarization holding fiber 14 may be a step of reducing the amount of offset. If the polarization angle of the polarization holding fiber 14 is offset with respect to the polarization angle of the polarizer 23, the intensity of the light detected by the light receiving element 24 differs depending on the wavelength of the light. Thus, by calculating the amount of offset between the polarization angle of the polarization holding fiber 14 and the polarization angle of the polarizer 23 based on the ratio between the intensities of the lights detected by the light receiving element 24, it is possible to adjust the angle of the polarization holding fiber 14 without using crosstalk of the polarization holding fiber 14.

Figure 8:
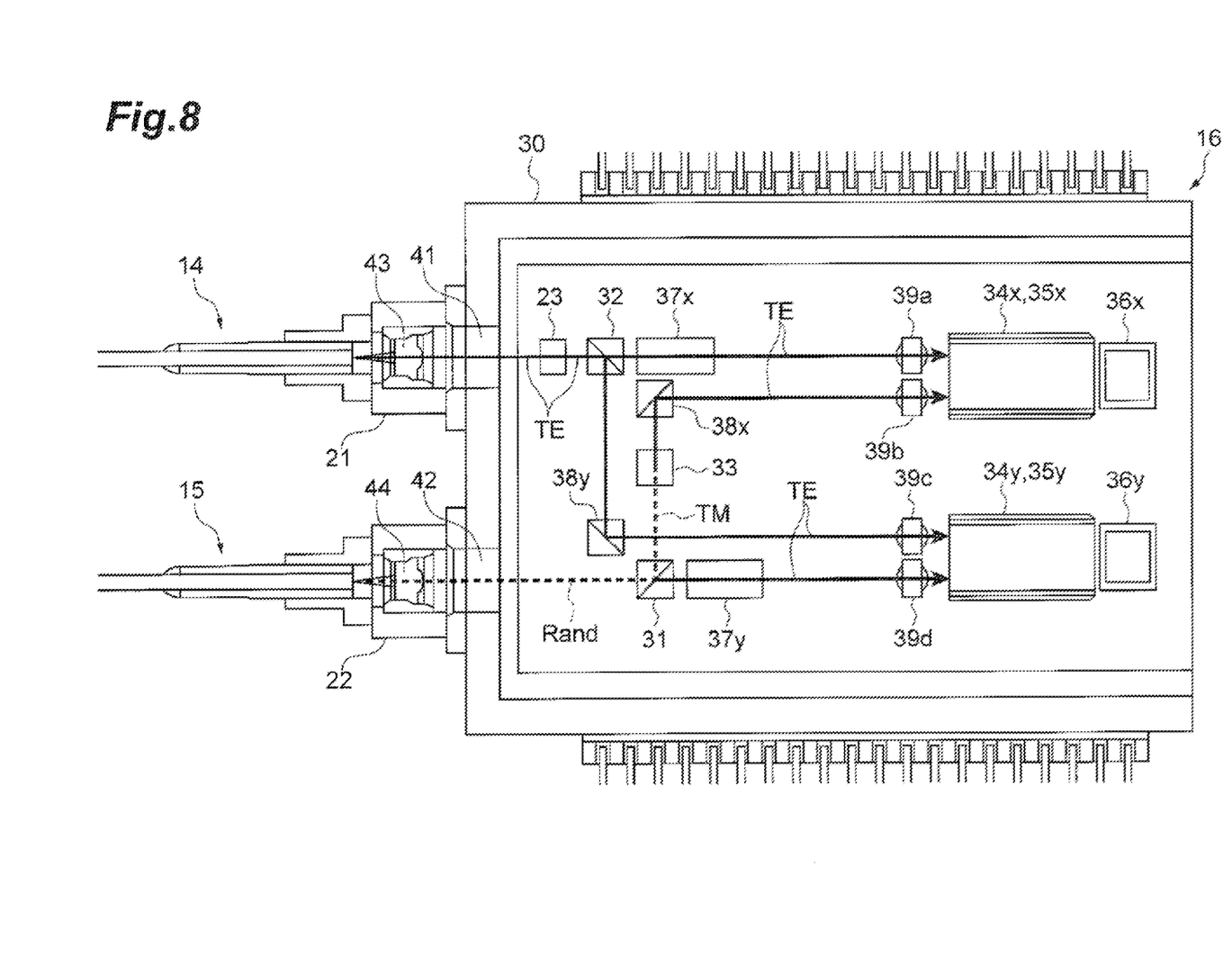
FIG. 8 shows an internal configuration of the optical receiver according to the embodiment of the present invention.

FIG. 8 shows an example of an internal configuration of the optical receiver 16. As shown in FIG. 8, the optical receiver 16 includes a package 30, a PBS 31, a polarizer 23, a beam splitter 32, a polarization rotor 33, 90-degree optical hybrid devices 34$x$, 34$y$, light receiving elements 35$x$, 35$y$, amplifiers 36$x$, 36$y$, skew adjusting elements 37$x$, 37$y$, mirrors 38$x$, 38$y$ that reflect incident lights, and collimator lenses 39$a$ to 39$d$ that collect incident lights.

In the package 30, a first input window 41 and a second input window 42 for connecting and securing an optical cable are formed. The fiber holder 21 is mounted to the first input window 41, and the polarization holding fiber 14 is secured to the fiber holder 21. A reference light is input via the polarization holding fiber 14 to the first input window 41. The fiber holder 22 is mounted to the second input window 42, and the polarization holding fiber 15 is secured to the fiber holder 22. A signal light is introduced into the second input window 42. The fiber holder 21 has a lens 43, and the fiber holder 22 has a lens 44.

The PBS 31 splits the signal light introduced by the polarization holding fiber 15 into X polarization and Y polarization perpendicular to each other. A light of the X polarization is incident on the Y-side 90-degree optical hybrid device 34y. A light of the Y polarization is turned into the X polarization with a polarization plane being rotated 90° by the polarization rotor 33, and is then incident on the X-side 90-degree optical hybrid device 34x. In this embodiment, the X polarization is a TM light, and the Y polarization is a TE light, but the X polarization may be the TE light, and the Y polarization may be the TM light. A light Rand incident on the PBS 31 is random in the polarization direction. A light traveling straight through the PBS 31 is the TE light, passes through the skew adjusting element 37y, is collected by the collimator lens 39d, and is introduced on the Y-side 90-degree optical hybrid device 34y. On the other hand, a light reflected 90° by the PBS 31 is the TM light, and then converted into the TE light by passing through the polarization rotor 33. The light is then reflected 90° by the mirror 38x, collected by the collimator lens 39b, and is introduced on the X-side 90-degree optical hybrid device 34x.

The beam splitter 32 splits the reference light emitted from the polarization holding fiber 14 into two. The reference light may be previously set to the X polarization, for example, via the polarizer 23, and is introduced on the X-side 90-degree optical hybrid device 34x and the Y-side 90-degree optical hybrid device 34y. One of the reference lights traveling straight through the beam splitter 32 passes through the skew adjusting element 37x, is collected by the collimator lens 39a, and incident on the X-side 90-degree optical hybrid device 34x. On the other hand, the other of the reference light reflected 90° by the beam splitter 32 is again reflected 90° by the mirror 38y, then collected by the collimator lens 39c, and is introduced on the Y-side 90-degree optical hybrid device 34y.

The 90-degree optical hybrid devices 34x, 34y cause the incident signal light and the incident reference light to interfere with each other in an optical circuit therein, and separate an interfering light into four components. The 90-degree optical hybrid devices 34x, 34y may be composed of, for example, a silica planar lightwave circuit. The signal light of the X polarization is combined with the reference light by the 90-degree optical hybrid device 34x, and then separated into a positive component (p) and a negative component (n) of an in-phase component I, and a positive component (p) and a negative component (n) of a quadrature phase component Q, and output as four optical signals (X-Ip, X-In, X-Qp, X-Qn). Similarly, the signal light of the Y polarization is also combined with the reference light by the 90-degree optical hybrid device 34y, and then separated into a positive component (p) and a negative component (n) of an in-phase component I, and a positive component (p) and a negative component (n) of a quadrature phase component Q, and output as four optical signals (Y-Ip, Y-In, Y-Qp, Y-Qn).

The light receiving elements 35x, 35y subject the interfering lights output from the 90-degree optical hybrid devices 34x, 34y, respectively to light-weight conversion into analog electric signals. The light receiving elements 35x, 35y correspond to the light receiving element 24 in FIG. 1. In FIG. 8, the 90-degree optical hybrid device 34x and the light receiving element 35x are configured to be stacked, and the 90-degree optical hybrid device 34y and the light receiving element 35y are configured to be stacked.

The amplifiers 36x, 36y combine and amplify the positive component and the negative component of a pair of electric signals output from the light receiving elements 35x, 35y, respectively. The amplifiers 36x, 36y respectively include, for example, a transimpedance amplifier (TIA).

The skew adjusting elements 37x, 37y are elements for delaying a phase of an incident light, and making adjustment so that optical path lengths of the lights on the X side and the Y side are equal. The skew adjusting elements 37x and 37y are made of a material having a higher refractive index than air (for example, glass). Among the reference lights incident from the polarization holding fiber 14, the light incident on the Y-side 90-degree optical hybrid device 34y is longer in the optical path length than the light incident on the X-side 90-degree optical hybrid device 34x by distances of the beam splitter 32 to the mirror 38y. Thus, the skew adjusting element 37x placed on the X side delays a phase of the X-side reference light, and makes adjustment so that the optical path length of the X-side reference light and the optical path length of the Y-side reference light are equal. Similarly, the skew adjusting element 37y placed on the Y side makes adjustment so that the optical path length of the X-side reference light and the optical path length of the Y-side reference light are equal.

The method for adjusting the optical receiver using the measuring system (apparatus for adjusting polarization) described above is not limited to the embodiment described above, but other variations may be made. Furthermore, in the embodiment described above, the steps S11 to S16 are exemplified as independent steps, but these steps may be simultaneously performed in any combination.

In the embodiment described above, the case where the number of the wavelengths of the light detected by the optical receiver 16 is two or three is exemplified, but four or more wavelengths of the light may be detected to calculate the adjustment value for the angle of the polarization holding fiber 14.

In FIG. 8, the structure in which the 90-degree optical hybrid device 34x and the light receiving element 35x are stacked is exemplified, but the 90-degree optical hybrid device 34x and the light receiving element 35x may be independent structures. Similarly, the 90-degree optical hybrid device 34y and the light receiving element 35y may be independent structures.

What is claimed is:

1. A method for adjusting an optical receiver including a polarization holding fiber configured to receive a light emitted from a light source and a polarizer configured to be irradiated with the light output from the polarization holding fiber, the method comprising:
    inputting a plurality of lights having different wavelengths to the polarization holding fiber;
    detecting intensities of the plurality of lights output from the polarization holding fiber;
    calculating an adjustment value for an angle of the polarization holding fiber based on a ratio of the detected intensities of the plurality of lights; and
    adjusting the angle of the polarization holding fiber based on the calculated adjustment value.

2. The method for adjusting an optical receiver according to claim 1, wherein each of the plurality of lights output from the polarization holding fiber is adjusted in polarization so that light receiving sensitivity of the optical receiver is maximum.

3. The method for adjusting an optical receiver according to claim 1,
wherein, in a case where: the adjustment value is an angle θ; a highest intensity among the detected intensities of the plurality of lights is Pmax; and a lowest intensity among the detected intensities of the plurality of lights is Pmin, the angle θ is calculated from formula (1) as follows, $$\cos 2\theta = \sqrt{P\text{min}/P\text{max}} \qquad (1).$$

4. The method for adjusting an optical receiver according to claim 1,
wherein the adjustment value is an amount of offset between a polarization angle of the polarization holding fiber and a polarization angle of the polarizer, and
wherein the adjusting of the angle of the polarization holding fiber includes reducing the amount of offset.

5. The method for adjusting an optical receiver according to claim 1, further comprising: securing the polarization holding fiber with the angle being adjusted.

6. The method for adjusting an optical receiver according to claim 1, further comprising: connecting the polarization holding fiber to the optical receiver.

7. An apparatus for adjusting polarization of an optical receiver comprising:
a polarization holding fiber configured to receive a light emitted from a light source;
a polarizer configured to be irradiated with the light output from the polarization holding fiber;
a polarization controller configured to adjust an angle of the polarization holding fiber; and
a control unit configured to control the polarization controller,
wherein, after the control unit detects intensities of a plurality of lights having different wavelengths and being output from the polarization holding fiber, the control unit is configured to calculate an adjustment value for an angle of the polarization holding fiber based on a ratio between the detected intensities of the plurality of lights, and
wherein the polarization controller is configured to adjust the angle of the polarization holding fiber based on the calculated adjustment value.

8. The apparatus for adjusting polarization of an optical receiver according to claim 7,
wherein each of the plurality of lights output from the polarization holding fiber is adjusted by the polarization controller so that light receiving sensitivity of the optical receiver is maximum.

9. The apparatus for adjusting polarization of an optical receiver according to claim 7,
wherein, in a case where: the adjustment value is an angle θ; a highest intensity among the detected intensities of the plurality of lights is Pmax; and a lowest intensity among the detected intensities of the plurality of lights is Pmin, the angle θ is calculated from formula (1), and
wherein the polarization controller is configured to adjust the angle of the polarization holding fiber based on the angle θ as follows, $$\cos 2\theta = \sqrt{P\text{min}/P\text{max}} \qquad (1).$$

10. The apparatus for adjusting polarization of an optical receiver according to claim 7,
wherein the adjustment value is an amount of offset between a polarization angle of the polarization holding fiber and a polarization angle of the polarizer, and
wherein the polarization controller is configured to make adjustment to reduce the amount of offset of the angle of the polarization holding fiber.

* * * * *